March 10, 1959　　　M. KORACH　　　2,877,266
PREPARATION OF PERACIDS
Filed June 4, 1957
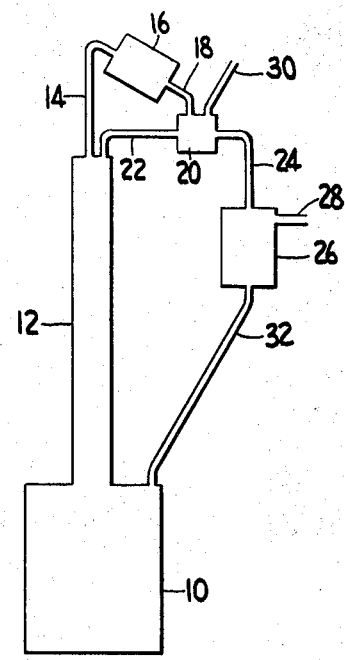
INVENTOR.
MALCOLM KORACH
BY
Oscar L. Spencer
ATTORNEY

United States Patent Office

2,877,266
Patented Mar. 10, 1959

2,877,266
PREPARATION OF PERACIDS

Malcolm Korach, Corpus Christi, Tex., assignor to Columbia-Southern Chemical Corporation, Allegheny County, Pa., a corporation of Delaware Application June 4, 1957, Serial No. 663,391

6 Claims. (Cl. 260—502)

This invention relates to the preparation of peracetic acid. Prior to the present invention it has been known that peracetic acid could be prepared by reaction of acetic acid with hydrogen peroxide. Hydrogen peroxide normally contains water and the reaction also evolves water. Consequently, the resulting reaction product normally contains water and acetic acid and usually contains 40 percent by weight or less of peracetic acid. Since the reaction of hydrogen peroxide with acetic acid is an equilibrium reaction, serious difficulty has been encountered in obtaining complete utilization of hydrogen peroxide and the acetic acid. Thus, it has been reported that as much as 10 moles of acetic acid would be required per mole of hydrogen peroxide in order to obtain conversion of 90 percent of the hydrogen peroxide to peracetic acid. The use of large excesses of acetic acid in a reaction of this character is objectionable in many cases, particularly since subsequent use of the peracetic acid may result in a product from which recovery of the acetic acid may be unfeasible. This means, for example, that in the overall performance of a process of epoxidation of an unsaturated compound with peracetic acid, an undue amount of acetic acid is consumed.

The problem is particularly complicated by reason of the fact that peracetic acid and hydrogen peroxide-acetic acid mixtures are explosive in certain concentrations. Moreover, certain potential by-products, such as diacetyl peroxide, are extremely explosive and care must be exerted in order to avoid the possibility of producing such by-products.

The present invention provides a simple method of producing peracetic acid in high yield and in high concentration with respect to water while avoiding the large excess of acetic acid or hydrogen peroxide hitherto required.

In accordance with the present invention, peracetic acid is prepared by mixing hydrogen peroxide, preferably in highly concentrated form, with acetic acid in a liquid phase in which an inert solvent which forms an azeotrope with water is present. Preferably such solvent should be immiscible with water or in which water has a low solubility (less than 50 grams per liter). As a consequence, the reaction of hydrogen peroxide with acetic acid takes place to a partial extent, thus producing a mixture of hydrogen peroxide, acetic acid, peracetic acid, water, and solvent. Water is then distilled from the mixture azeotropically by distilling an azeotrope of the solvent and water therefrom. This process may be conducted above, at or below atmospheric pressure.

As the water is removed, the reaction proceeds to completion, or substantially so, and the acetic acid is largely converted to peracetic acid. During the course of the reaction and the distillation, enough solvent is maintained in the mixture to provide at least 25 weight percent of the solvent based upon the weight of hydrogen peroxide, peracetic acid, and solvent therein. By producing peracetic acid according to this procedure, a product is obtained in high yield, normally consuming in excess of about 85 to 90 percent of the actic acid and 85 to 90 percent of the hydrogen peroxide, and resulting in the production of peracetic acid in a concentration in excess of about 75 percent by weight on a solvent free basis. The peracetic acid thus produced is quite free of impurities normally containing less than 25 percent by weight of impurities or contaminants other than the solvent used in its production.

In the course of the practice of this process, the temperature of the reaction should be maintained relatively low. The temperature of the liquid reaction mixture preferably should not exceed 100° C.

To avoid the necessity of distilling an excessive amount of water, the hydrogen peroxide used should contain at least about 50 percent by weight $H_2O_2$. For most efficient operation, hydrogen peroxide solutions containing at least 70 to 90 percent by weight of hydrogen peroxide are found to be most suitable. By use of such high concentrations, optimum yields can be obtained.

The amount of hydrogen peroxide which is added to the acid should be enough to consume at least the major portion of the acetic acid. Normally, approximately stoichiometric amounts of hydrogen peroxide and acetic acid are used, the hydrogen peroxide being in slight excess (1 to 10 percent by weight). However, about 0.75 to 1.5 moles of hydrogen peroxide per mole of acetic acid is within the purview of this invention.

Especially valuable solvents for the purpose herein contemplated are the halogenated or chlorinated hydrocarbons which form water azeotropes which boil at a temperature below 100° C. Such chlorinated hydrocarbons include carbon tetrachloride, ethylene dichloride, methyl chloride, methylene chloride, and the like. Moreover, other hydrocarbon halides, such as the fluorochloro carbons, i. e., dichlorodifluoromethane, and the like, also may be used. In addition, other solvents which form azeotropes with water, which distill off at temperatures below 100° C., may be used. Other typical solvents are benzene and toluene.

In general, a very substantial concentration of solvent is maintained present. To avoid premature decomposition of the peracetic acid, the reaction mixture during distillation of water therefrom should contain at least 25 weight percent of solvent based upon the weight of hydrogen peroxide, peracetic acid, and solvent present. Normally, much larger amounts of solvent are used and, in general, the amount of solvent normally exceeds 50 weight percent based upon the weight of hydrogen peroxide, peracetic acid, and solvent used.

The process may be conducted readily in an apparatus of the character illustrated in the accompanying drawing which is a diagrammatic sketch of such apparatus. As therein indicated, the apparatus comprises a flask or kettle suitable for use as a reactor 10 communicating with a fractionating column 12. The upper end of the fractionating column exits through line 14 to a condenser 16 which discharges through line 18 to a reflux splitter 20. A portion of the condensed liquid is refluxed to the top or upper portion of the column through line 22 and the balance is discharged through line 24 to a settler 26.

In a typical practice of the process, acetic acid, solvent, and hydrogen peroxide are introduced into reactor 10 and distillation of the azeotrope of the solvent and the water is commenced through column 12. Distillation of peracetic acid, acetic acid, and hydrogen peroxide through the column is prevented by maintaining a relatively high rate of reflux. The vapors of the azeotrope are led from the top of the column through line 14 to a condenser 16 where they are condensed and conveyed through line 18 to a reflux splitter. There the condensed liquid is split into two fractions, one of which is returned through line 22 to the top of the column and the other of which is discharged through line 24. Also provided in the system, for example, in the splitter, is an exit line 30 for connection to a suitable vacuum line for evacuating the system and maintaining the system under a subatmospheric pressure.

The condensed water and solvent discharging through line 24 is conveyed to a settling chamber 26 where solvent is allowed to separate from the water forming a pair of liquid layers. Water is drawn off periodically or continuously through line 28, and the solvent which separates in the settling chamber by virtue of its immiscibility with water and its difference in density is collected and returned to the reactor 10 through line 32. This distillation is continued until the major portion of the water is driven off. Thus a product containing less than 15 percent, usually less than 7.5 percent by weight of water (excluding the organic solvent forming the azeotrope) is produced.

It will be understood that the process may be conducted by adding the acetic acid, hydrogen peroxide, and solvent, together with catalyst, direct to the reactor 10. However, it is frequently convenient to effect this reaction outside the equipment illustrated in the drawing and then, after the reaction has proceeded essentially to equilibrium, for example, to 25 to 50 percent conversion of the acetic acid, the mixture is supplied to the reactor 10 and the distillation of the azeotrope is commenced in order to drive off water.

The reaction normally is carried on in the presence of small catalytic amounts of a suitable catalyst, such as sulphuric acid.

The following example is illustrative:

Example I 250 milliliters of ethylene dichloride was placed in a 500-milliliter Pyrex glass flask with 30 grams of acetic acid containing 500 parts per million of dipicolinic acid and a small amount of sulphuric acid. The reactor used was of the general type illustrated in the drawing except that no provision was made for reflux. That is, there was no reflux splitter 20.

The reaction system was closed, evacuated to a pressure of 140–175 millimeters of mercury, and 0.5 mole of an aqueous solution containing 90 percent by weight of hydrogen peroxide was added to the ethylene dichloride solution. Solvent and water distillation was commenced, maintaining the temperature of the reaction mixture at about 42° C. When ethylene chloride was used as the solvent, distillation was conducted at 170 millimeters mercury pressure.

The reaction mixture was maintained at the above temperature for 1.7 hours, during which time 480 milliliters of the ethylene dichloride was distilled off, the water removed therefrom, and the ethylene dichloride recycled to the reactor. Fifteen milliliters of water was collected in the collector. Ninety-two percent by weight of the acetic acid added was converted to peracetic acid. The yield of peracetic acid produced, based on hydrogen peroxide, was 94 percent, and based on acetic acid was 97 percent of theoretical. The peracetic acid produced contained about 2 percent by weight of acetic acid and 3 percent by weight of hydrogen peroxide, excluding the solvent which was present. There was less than 1 percent by weight of water present, and other than solvent there was no substantial concentration of other impurities. Thus the peracetic acid produced had a purity of above 90 percent excluding the ethylene dichloride.

It is to be understood that the process herein contemplated may be applied to the production of other percarboxylic acids by reaction of hydrogen peroxide with a carboxylic acid, such as propionic, maleic, glutaric, adipic, pelargonic, azelaic, lauric, benzoic, and phthalic acids, and like carboxylic acids. Thus, any of the above acids may be used in the practice of the above example using the equivalent amount of any of the above acids in lieu of acetic acid in such example.

Moreover, residual water and hydrogen peroxide which is present in the resulting solution of peracetic acid or other percarboxylic acid may be removed by adding thereto a carboxylic acid anhydride in amount substantially stoichiometric to the water and hydrogen peroxide. Thus, the water and hydrogen peroxide present in the solution produced according to Example I may be removed by adding thereto up to about 5 percent by weight of acetic anhydride or an equivalent amount of another anhydride such as phthalic anhydride, maleic anhydride, butyric acid anhydride and the like.

Although the present invention has been described with reference to the specific details of certain embodiments, it is not intended that such details shall be regarded as limitations upon the scope of the invention except insofar as included in the accompanying claims.

What is claimed is:

1. A method of preparing peracetic acid which comprises mixing hydrogen peroxide with acetic acid in liquid phase comprising a water immiscible inert solvent which boils at a temperature below about 100° C. and forms an azeotrope with water thereby forming a mixture comprising the solvent, acetic acid, peracetic acid, hydrogen peroxide, and water, distilling from the mixture an azeotrope of solvent and water thereby causing formation of further peracetic acid, refluxing a portion of the vapor thus formed to condense hydrogen peroxide and acetic acid vapor from the mixture and separately removing and condensing another portion of said vapor which contains water, permitting the water and solvent in the resulting condensate of said other portion to separate, returning the solvent recovered from the condensate to the mixture being heated, and continuing said distillation until the major portion of water is driven off, while maintaining the concentration of solvent in contact with the peracetic acid thus formed high enough to maintain in the mixture at least 25 percent by weight of said solvent, based upon the weight of hydrogen peroxide, peracetic acid, and solvent therein, throughout the period of reaction and distillation.

2. The process of claim 1 wherein the solvent is a halogenated hydrocarbon.

3. The process of claim 1 wherein the solvent is a chlorinated hydrocarbon.

4. A method of preparing percarboxylic acid which comprises mixing hydrogen peroxide with carboxylic acid in liquid phase comprising a water immiscible inert solvent which boils at a temperature below about 100° C. and forms an azeotrope with water thereby forming a mixture comprising the solvent, carboxylic acid, percarboxylic acid, hydrogen peroxide, and water, distilling from the mixture an azeotrope of solvent and water thereby causing formation of further percarboxylic acid, refluxing a portion of the vapor thus formed to condense hydrogen peroxide vapor from the mixture and separately condensing another portion of said vapor which contains water, permitting the water and the solvent in the resulting condensate of said other portion to separate, returning the solvent recovered from the condensate to the mixture being heated, and continuing said distillation until the major portion of water is driven off, while maintaining the concentration of solvent in contact with the percarboxylic acid thus formed high enough to maintain in the mixture at least 25 percent by weight of said solvent, based upon the weight of hydrogen peroxide, percarboxylic acid, and solvent therein, throughout the period of reaction and distillation.

5. The process of claim 1 wherein the solvent is ethylene dichloride.

6. The process of claim 4 wherein the solvent is ethylene dichloride.

References Cited in the file of this patent

UNITED STATES PATENTS 2,814,641    Phillips _____ Nov. 26, 1957